(12) United States Patent
Goldberg et al.

(10) Patent No.: US 6,196,146 B1
(45) Date of Patent: Mar. 6, 2001

(54) WEB BASED EMBROIDERY SYSTEM AND METHOD

(75) Inventors: Brian Goldberg, Thornhill; Niranjan Mayya, Mississauga; Anastasios Tsonis, Kitchener, all of (CA); Claude Vlandis, Fort Lauderdale, FL (US)

(73) Assignee: Pulse Microsystems Ltd., Mississauga (CA)

( * ) Notice: Subject to any disclaimer, the term of this patent is extended or adjusted under 35 U.S.C. 154(b) by 0 days.

(21) Appl. No.: 09/533,576

(22) Filed: Mar. 23, 2000

(51) Int. Cl.[7] .......................... D05B 19/12; G06F 17/60; D05C 7/00
(52) U.S. Cl. ................... 112/470.04; 112/102.5; 112/475.19; 705/27
(58) Field of Search .................. 112/470.04, 470.06, 112/102.5, 475.01, 475.08, 475.09, 475.18, 475.19; 705/1, 26, 27, 28, 39, 40; 700/138; 412/19, 35

(56) References Cited

U.S. PATENT DOCUMENTS

| | | | |
|---|---|---|---|
| 5,893,200 | * | 11/1999 | Slotznick ............................ 705/26 |
| 5,924,372 | * | 7/1999 | Okuda et al. .................... 112/102.5 |
| 5,924,374 | * | 7/1999 | Mori et al. ................. 112/574.19 X |
| 6,012,890 | * | 1/2000 | Garrido ................................ 412/19 |

* cited by examiner

*Primary Examiner*—Peter Nerbun
(74) *Attorney, Agent, or Firm*—Lawrence G. Kurland, Esq.; Bryan Cave LLP

(57) ABSTRACT

A web based embroidery system capable of creating an automatically fulfilling a user customized embroidery order for a selectable garment over the internet. The system includes the ability to select the garment to be customized over the internet, to selectably locate an embroidery area on that garment, to select a customized embroidery pattern over the internet to be located in the user selected embroidery area, the ability to display an embroided simulation of the user located customized embroidery pattern on the selected garment, and the ability to provide embroidery pattern controlled signals over the internet to a remotely located embroidery machine for automatically stitching the user located customized embroidery pattern on an actual garment corresponding to the selected garment based on the displayed embroided simulation, which maybe a three dimensional simulation. In addition, customized embroidery lettering can be created and may be combined with a preexisting embroidery pattern. Furthermore, on-line editing may be employed as well as individual colorizing by the user. This can be accomplished on customized web sites as well as templated websites. In addition, a system is enclosed which permits autodigitizing of user generated images over the internet which may be automatically converted into embroidery patterns, cost estimates based thereon and, after confirmation by the user, used to automatically generate embroidery patterns on actual garments.

33 Claims, 6 Drawing Sheets

WEB BASED EMBROIDERY SYSTEM AND METHOD

BACKGROUND OF THE INVENTION

1. Field of the Invention

The present invention relates to embroidery systems and methods and particularly to a web based embroidery system and method.

2. Description of the Prior Art

Embroidery systems capable of creating customized patterns are well know such as available from Pulse Microsystems under the designations Pulse Signature. Other such systems are also available from Brother Kogyo, Kabushiki, Kaisha, such as disclosed in U.S. Pat. Nos. 6,012,402; 5,988,083; 5,865,134; 5,924,374; and 5,924,372. The above mentioned patents generally refer to the possibility of utilizing the internet to transmit embroidery data but do not dislikes any system or method for implementation of such an approach. Two recent prior art web based systems utilizing the Internet allow some customization of a garment over the Internet. These websites are known as www.madetoorder.com and www.starbelly.com. However, these prior art web based systems do not include a capability of automatically generating embroidery lettering or the ability to create truly customized embroidery designs nor do they allow automatic fulfillment of a user customized embroidery order for a selectable garment over the internet. For example, these prior art systems do not work with embroidery data but rather work with bitmap raster images. In addition, any display of images to the user is only a two dimensional image and is not a three dimensional embroidery simulation. Thus, it is difficult for the user to have a realistic picture of the embroidery pattern being ordered on the garment that the user has selected. In addition, none of these prior art systems permits autodigitizing of customer created art work over the internet such as the ability to upload these images, convert them to an embroidery pattern and provide a cost estimate to the user quickly by allowing the user to thereafter confirm the order and have the embroidery pattern generated on an actual garment in order to fulfill the order. These disadvantages of the prior art are overcome by the present invention.

SUMMARY OF THE INVENTION

A method and system is disclosed for a web based embroidery system capable of creating and automatically fulfilling a user customized embroidery order for a selectable garment over the internet. The system includes the ability to select the garment to be customized over the internet, to selectably locate an embroidery area on that garment, to select a customized embroidery pattern over the internet to be located in the user selected embroidery area, to display an embroidered simulation of the user located customized embroidery pattern on the selected garment, which may be three dimensional, and to provide embroidery pattern control signals over the internet to a remotely located embroidery machine for automatically stitching the user located customized embroidery pattern on an actual garment corresponding to the selected garment based on the displayed embroided simulation. In addition, customized embroidery lettering can be created and may be combined with a preexisting embroidery pattern. Furthermore, on-line editing may be employed as well as individual colorizing by the user. This can be accomplished on customized web sites as well as templated websites. In addition, a system is disclosed which permits autodigitizing of user generated images over the internet which may be automatically converted into embroidery patterns, cost estimates provided to the user based thereon and, after confirmation by the user, the converted pattern may be used to generate embroidery patterns on actual garments.

DETAILED DESCRIPTION OF THE PREFERRED EMBODIMENT

Figure 1:
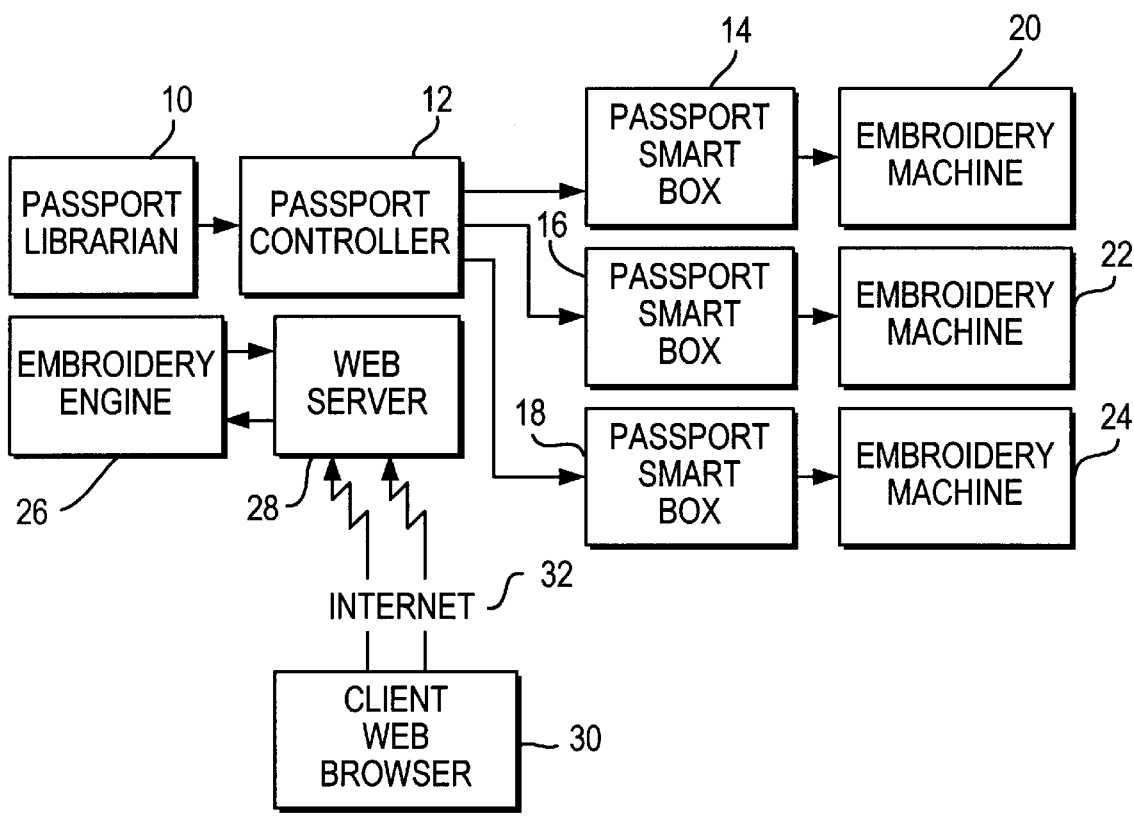
FIG. 1 is a block diagram illustrating the web based embroidery system in the present invention.

Referring to the drawings in detail, and initially to FIG. 1 thereof, the overall web based embroidery system of the present invention is shown. As shown and preferred in FIG. 1, the web based system of the present invention prefereably includes a convention PASSPORT LIBRARIAN, which is embroidery software commercially aware from Pulse Microsystems and is a respository for embroidery designs, which interfaces with Passport Controller 12, which is also commercially available from Pulse Microsystems and allows for the networking of embroidery machines through conventional interfaces from Pulse term PASSPORT SMART BOXES 14, 16, 18. The PASSPORT SMART BOXES 14, 16, 18 are each conventionally connected to conventional embroidery machines 20, 22, 24, respectively, such as those available J. TAJIMA. The PASSPORT CONTROLLER 12 permits the networking of the embroidery machines 20, 22, 24 through the respective PASSPORT SMART BOXES 14, 16, 18 and the downloading of embroidery designs from PASSPORT LIBRARIAN 10 to the PASSPORT SMART BOXES 14, 16, 18. As further shown and preferred in FIG. 1, in the web based system of the present invention, the embroidery engine 26 is separated from the web server 28 and the PASSPORT LIBRLAN 10 and interfaces between the two. The web server 28 is connected to the client web browser 30 via the internet 32 in conventional manner.

The embroidery engine 26 is preferably a single software module or a collection of software modules that provide the desired embroidery functionality that is part of the Web based embroidery system of the present invention. Typically, this embroidery functionality includes such functions as creation of embroidery lettering, creation of an embroidery design or pattern that merges and existing design with embroidery lettering, creation of three dimensional embroidery simulations of embroidery designs or patterns, and conversion of an image into an actual embroidery design or pattern. This type of functionality is typically found in existing embroidery design systems such as the comically available PULSE SIGNATURE. The embroidery engine can preferably be implemented by conventionally wrapping the functions into a DCOM object, which is a Distributed Component Object Model which is conventional microsoft technology that exposes the interface of the embroidery engine 26 to the web server 28.

The web server 28 is preferably a conventional Microsoft Internet Information Server which employs a microsoft transaction server to support the DCOM communication protocol that is preferably used for communicating with the embroidery engine 26. Preferably the web interface is developed using active server pages which allows the use of HTML, Javascript and Vbscript to create the web interface.

Figure 2:
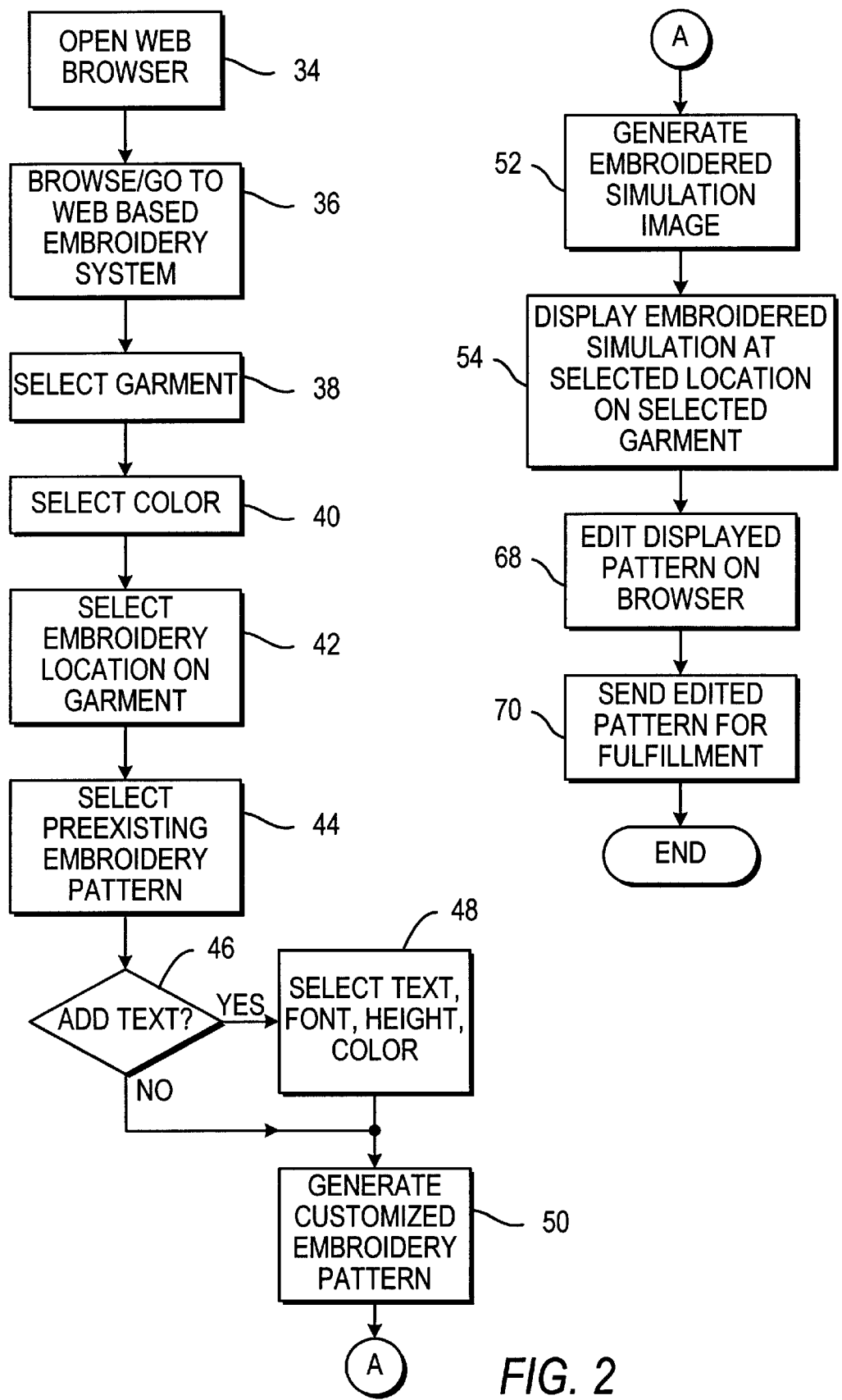
FIG. 2 is a system flow diagram of the presently preferred method employing the web based embroidery system of FIG. 1.
Figure 3:
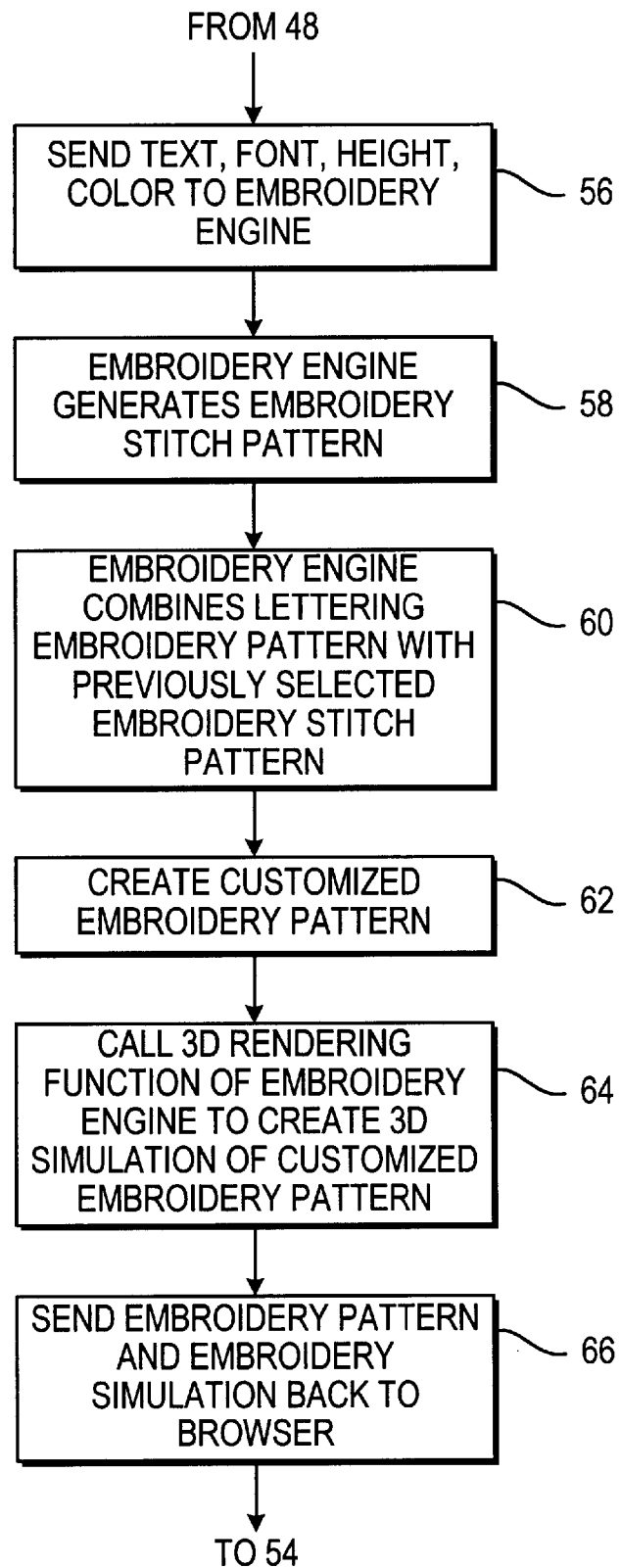
FIG. 3 is a system flow diagram similar to FIG. 2, in greater detail of a portion of the flow diagram of FIG. 2, illustrating the generation of the customized embroidery pattern and embroidery simulation image in accordance with the present invention.
Figure 5:
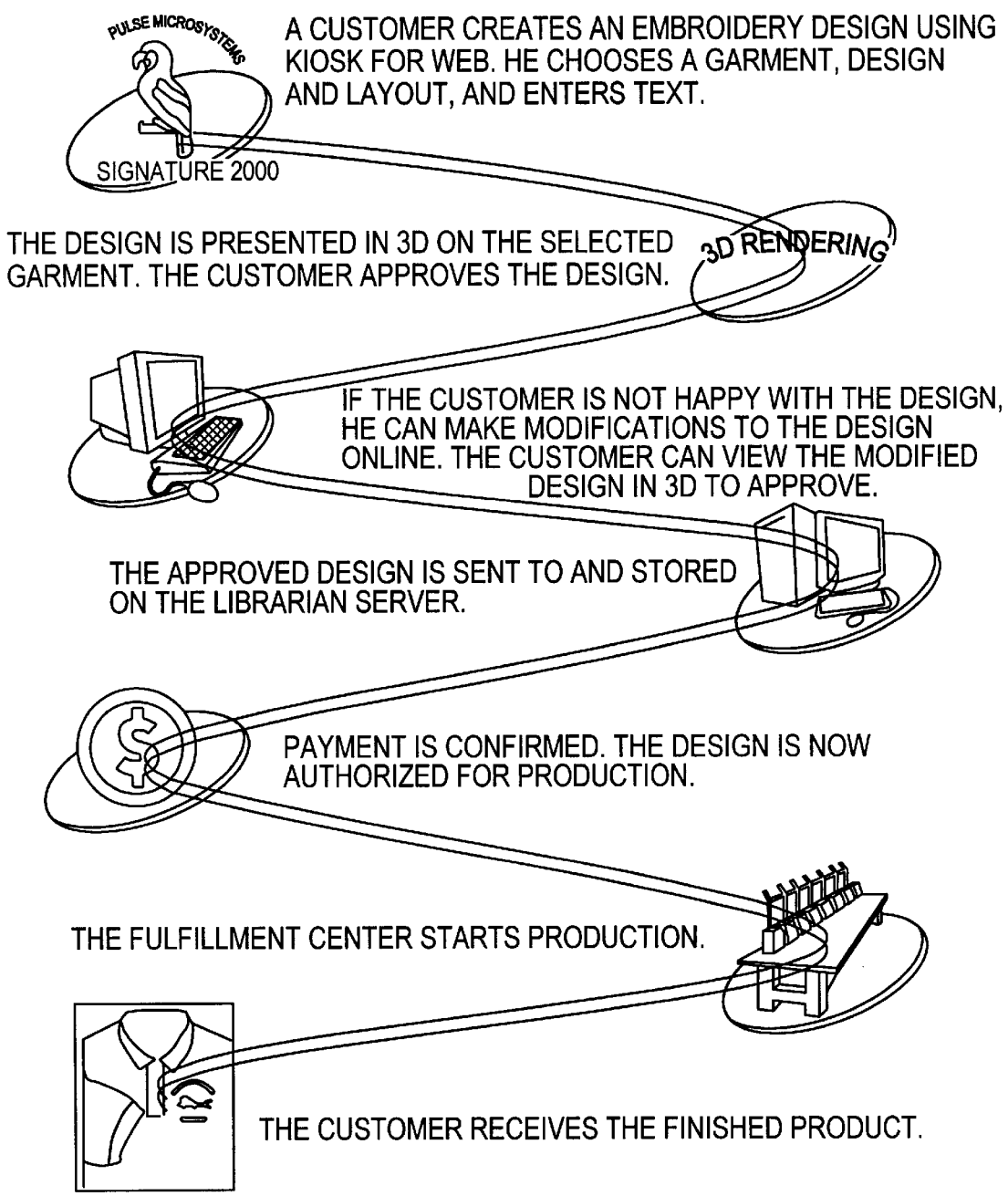
FIG. 5 is an illustrative diagram illustrating the workflow in accordance with the method illustrated in FIG. 2.

Referring now to FIGS. 2, 3 and 5, the web based embroidery system and method of the present invention is illustrated. As shown and preferred, the user conventionally opens his web browser 30 as represented by reference numeral 34 in FIG. 2, and the system then conventionally browses and goes to the web based embroidery system via the internet 32 as represented by reference numeral 36 in FIG. 2. A display is provided to the user of a series of garments which the user may select for embroidery through conventional software and the user selects the garment which is to have customized embroidery placed on it. The user also has the ability to select the color of the garment to be embroidery and a color rendition of that garment is displayed. These two steps in the presently preferred method of the present invention are represented by reference numerals 38 and 40 in FIG. 2. The user then selects the embroidery location or area on the display garment where it is desired to place the embroidery. This is represented by reference number 42 in FIG.2.

Thereafter, the user selects an embroidery pattern to be placed at that location, such as a preexisting embroidery pattern stored in PASSPORT LIBRARIAN 10. This is represented by reference numeral 44 in FIG. 2. In accordance with the presently preferred method of the present invention, the user has the ability to also add text for embroidery lettering to the embroidery pattern to create a customized combined embroidery pattern. If the user adds text, he has the ability to select, in conventional fashion, the text, the font, the height of the lettering and the color of the lettering. These steps are represented by reference numerals 46 and 48 in FIG. 2. Whether or not text is added to the pattern, the customized embroidery pattern is then generated and the embroidery engine then generates an embroidery simulation image which is preferably a three dimensional embroided simulation displayed at the selected location on the selected garment at the user site. These steps are represented by reference numerals 50, 52 and 54 in FIG. 2. These steps are illustrated in greater detail in FIG. 3. As shown and preferred in FIG. 3, the text, font, height, and coloring of the letters are sent to the embroidery engine 26 for combination with the preexisting embroidery pattern that was selected from PASSPORT LIBRARIAN 10. This step is represented in FIG. 3 by reference numeral 56. The embroidery engine 26 then preferably generates the embroidery stitch pattern which has been selected, as represented by reference numeral 58 in FIG. 3, and combines the lettering embroidery pattern created by the user with the previously selected embroidery stitch pattern, as represented by reference numeral 60 in FIG. 3. The customized embroidery pattern which is displayed at the user site and sent over the internet 32 is thereby created, as represented by reference numeral 62 in FIG. 3. The three dimensional rendering function of the embroidery engine 26 is then called up to create the three dimensional simulation of the customized embroidery pattern, as represented by reference numeral 64 in FIG. 3, and the embroidery pattern and embroidery simulation are sent back to the client or user web browser 30 via the internet 32, as represented by reference numeral 66 in FIG. 3, for display at the user site. Preferably, the user may edit the display pattern on the web browser 30, as represented by referenced numeral 68 in FIG. 2 and then the edited pattern is sent back via the internet 32 through the web server 28 and the embroidery engine 26 to the PASSPORT CONTROLLER 12 and on to the embroidery machine 20, 22, or 24 through the appropriate PASSPORT SMART BOX 14, 16, or 18 to automatically fulfill the customized embroidery order by stitching the customized embroidery pattern on an actual garment corresponding to the selected garment at the selected location indicated by the user. This fulfillment step is represented by reference numeral 70 in FIG. 2.

In editing the pattern, the user preferably loads a Java applet that performs, in conventional fashion, editing functionality from the web server 28 to the web browser 30. This allows the user to edit the elements of the design or pattern, such as the lettering and/or the preexisting embroidery pattern. Editing of the lettering may include such things as modifying the text, the size, the color, the font or the location of the lettering. Similarly, editing of the preexisting embroidery pattern may include such things as modifying the size or location of the pattern within the location box previously selected. When the editing is completed, preferably a customized embroidery pattern is regenerated on the web server 28 by the embroidery engine 26 utilizing the newly edited parameters.

FIG. 5 illustrates the automatic fulfillment of a customized embroidery pattern on a selected garment in accordance with the method described above. In this regard, the web server 28 preferably generates an order number for the current transaction and the embroidery engine 26 generates the customized embroidery pattern as described above. The embroidery engine 26 preferably save the customized embroidery pattern in PASSPORT LIBRARIAN 10 using the order number as a file name. The web server 28 generates an order file that is transmitted to the embroidery machine 20, 22, or 24 or to the machine operator, who then enters the order number on the associated PASSPORT SMART BOX 14,16, or 18. The PASSPORT SMART BOX 14, 16, or 18 then sends the order number to the PASSPORT CONTROLLER 12 which then sends the order number on to the PASSPORT LIBRARIAN 10. The PASSPORT LIBRARIAN then retrieves the customized embroidery pattern and sends it back to the PASSPORT CONTROLLER 12, which then sends this customized pattern on to the appropriate PASSPORT SMART BOX 14, 16, or 18 which then, in turn, then sends the pattern control signals on to the associated embroidery machine 20, 22, or 24 which then automatically stitches the selected customized pattern on the selected garment at the selected location. As noted in FIG. 5, the confirmation step may involve the transmission of payment via the internet 32, in conventional fashion, prior to the embroidery machine 20, 22, or 24 stitching the customized pattern.

Figure 4:
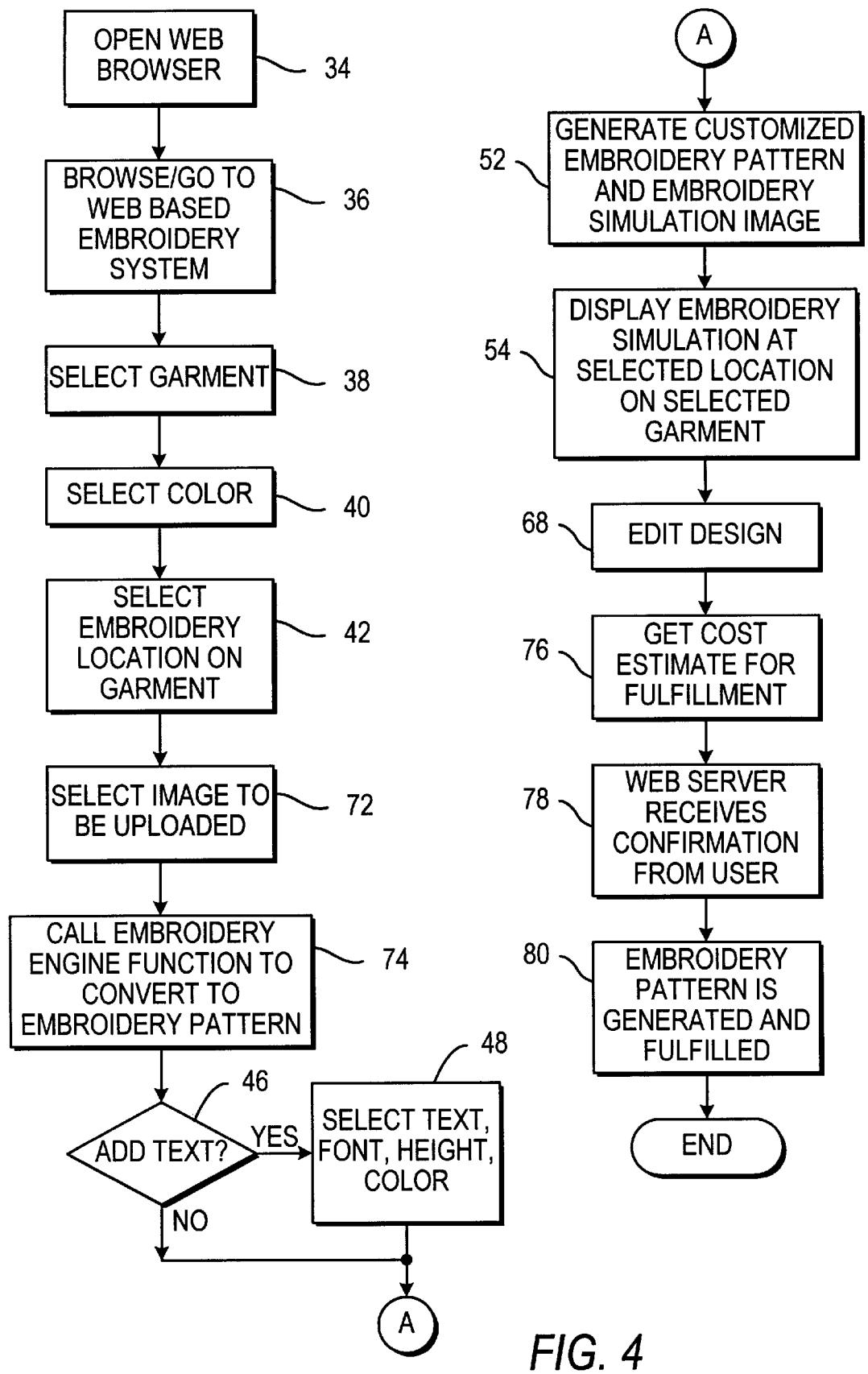
FIG. 4 is system flow diagram similar to FIG. 2, of the autodigitizing function in accordance with the present invention.
Figure 6:
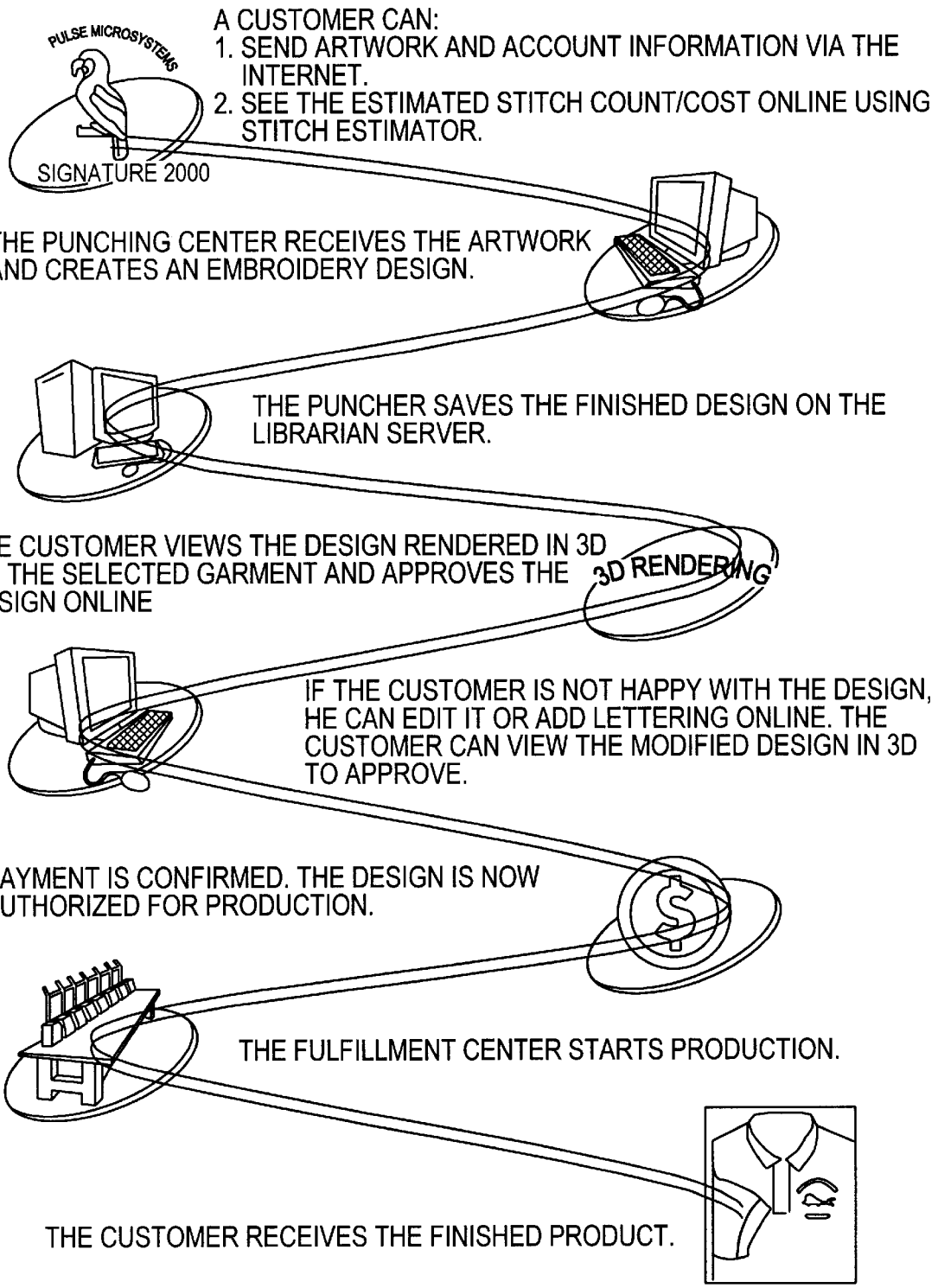
FIG. 6 is an illustrative diagram, similar to FIG. 5, illustrating the design tracking workflow in connection with the autodigitizing method of the present invention illustrated in FIG. 4.

Referring now to FIG. 4, the presently preferred method of autodigitizing of customer created artwork is illustrated. This method enables user created bit map designs to be uploaded and autodigitized to create an embroidery pattern which may be costed out for the customer, approved by the customer and then stitched on an actual garment, all via the internet 32. As shown and preferred in FIG. 4, the first few steps of the process up through the selection of the embroidery location on the garment are preferably the same as described with reference to FIG. 2 and have been given the same reference numerals. After the embroidery location on the garment is selected, the image to be uploaded is selected by the user and transmitted as a bit map over the internet 32 from the web browser 30. This is represented by reference numeral 72 in FIG. 4. The embroidery engine function for converting this bit map to an embroidery pattern is then called up in the embroidery engine 26 as represented by reference numeral 74 in FIG. 4. The next few steps of adding text or customized lettering if desired, generating a customized embroidery pattern and embroidery simulation image which is preferably a three dimensional simulation, and displaying the embroidery simulation at the selected location on the selected garment are preferably the same as previously described with reference to FIG. 2 and the same references numerals are employed in FIG. 4. Similarly, the displayed design may be edited, as was described with reference to FIG. 2 and the same reference numeral is employed in FIG. 4 as was utilized for this function in FIG. 2. At this point, preferably, since the bit map has been converted into an embroidery pattern, a cost estimate can be provided for stitching that embroidery pattern based on information stored in the system relating to such variables as stitch count etc. that are conventionally utilized to estimate the cost of stitching embroidery patterns. This cost estimate is preferably sent to the web browser 30 via the internet 32 and displayed at the user site. This step is represented by reference numeral 76 in FIG. 4. Assuming that the cost estimate is satisfactory to the user, the user then sends a confirmation to the web server 28 via the internet 32. Again, this confirmation may be in the form of authorizing payment. This step is represented by reference numeral 78 in FIG. 4. The embroidery pattern, after confirmation, is then generated and automatically fulfilled in the same manner as was previously described with reference to FIG. 2, as represented by reference numeral 80 in FIG. 4. FIG. 6 is an illustrative diagram of a typical process in accordance with the autodigitizing function described above, starting with customer art work and ending with embroided finished product.

Thus, in accordance with the present invention, preexisting embroidery patterns may be automatically fulfilled or user generated art work may be converted to an embroidery pattern and automatically fulfilled. In either instance, customized lettering may be created by the user and combined with the embroidery pattern. In this matter, a true web based embroidery system which permits both customized order entry and automatic fulfillment may be achieved with the user having the opportunity to first view a three dimensional embroidery simulation of the end product before it is stitched.

The foregoing embodiments are merely illustrative of the present invention and various modifications and changes within the skill of persons in the art may be accomplished without departing from the present invention.

What is claimed is:

1. A web based embroidery system capable of creating and automatically fulfilling a user customized embroidery order for a selectable garment over the internet, said system comprising:

means for selecting a garment to be customized over the internet;

means for selectably locating an embroidery area on said selected garment from a plurality of user selectable locations;

means for selecting a customized embroidery pattern over the internet to be located in said user selected embroidery area;

means for displaying an embroidered simulation of said user located customized embroidery pattern on said selected garment; and means for providing embroidery pattern control signals over the internet to a remotely located embroidery machine for automatically stitching said user located customized embroidery pattern on an actual garment corresponding to said selected garment based on said displayed embroidered simulation for automatically fulfilling said user customized embroidery order.

2. An embroidery system in accordance with claim 1 wherein said embroidered simulation is a three dimensional embroidered simulation.

3. An embroidery system in accordance with claim 1 wherein said means for selecting a customized embroidery pattern comprises means for creating customized embroidery lettering.

4. An embroidery system in accordance with claim 3 wherein said means for selecting a customized embroidery pattern further comprises means for combining a preexisting embroidery pattern with said customized embroidery lettering.

5. An embroidery system in accordance with claim 1 further comprising means for enabling on-line editing of said user selected customized embroidery pattern.

6. An embroidery system in accordance with claim 1 further comprising means for varying colors in said selected customized embroidery pattern for providing a user custom colored customized embroidery pattern on said selected garment.

7. An embroidery system in accordance with claim 1 further comprising means for providing a templated web site for said web based embroidery system.

8. An embroidery system in accordance with claim 2 wherein said means for selecting a customized embroidery pattern comprises means for creating customized embroidery lettering.

9. An embroidery system in accordance with claim 8 wherein said means for selecting a customized embroidery pattern further comprises means for combining a preexisting embroidery pattern with said customized embroidery lettering.

10. An embroidery system in accordance with claim 9 further comprising means for enabling on-line editing of said user selected customized embroidery pattern.

11. An embroidery system in accordance with claim 10 further comprising means for varying colors in said selected customized embroidery pattern for providing a user custom colored customized embroidery pattern on said selected garment.

12. An embroidery system in accordance with claim 11 further comprising means for providing a templated web site for said web based embroidery system.

13. An embroidery system in accordance with claim 2 further comprising means for enabling on-line editing of said user selected customized embroidery pattern.

14. An embroidery system in accordance with claim 13 further comprising means for varying colors in said selected customized embroidery pattern for providing a user custom colored customized embroidery pattern on said selected garment.

15. An embroidery system in accordance with claim 14 further comprising means for providing a templated web site for said web based embroidery system.

16. An embroidery system in accordance with claim 2 further comprising means for varying colors in said selected customized embroidery pattern for providing a user custom colored customized embroidery pattern on said selected garment.

17. A web based embroidery system capable of creating a user customized embroidery order for a selectable garment over the internet, said system comprising:
   means for selecting a garment to be customized over the internet;
   means for selectably locating an embroidery area on said selected garment from a plurality of user selectable locations;
   means for uploading a user generated image over the internet;
   means for automatically converting said uploaded used generated image into an embroidery pattern; and
   means for displaying an embroidered simulation of said converted user located embroidery pattern on said selected garment.

18. An embroidery system in accordance with claim 17 further comprising means for providing a cost estimate for stitching said embroidery pattern on an actual garment corresponding to said selected garment at said user selected location.

19. An embroidery system in accordance with claim 18 further comprising means for confirming said embroidery order for said converted embroidery pattern and for providing embroidery pattern control signals over the internet to a remotely located embroidery machine for automatically stitching said converted embroidery pattern on said actual garment at said user selected location in response to said confirmed embroidery order.

20. An embroidery system in accordance with claim 17 further comprising means for creating customized embroidery lettering.

21. An embroidery system in accordance with claim 20 further comprising means for combining said converted embroidery pattern with said customized embroidery lettering for providing a customized embroidery pattern on said selected garment at said user selected location.

22. An embroidery system in accordance with claim 19 further comprising means for creating customized embroidery lettering.

23. An embroidery system in accordance with claim 22 further comprising means for combining said converted embroidery pattern with said customized embroidery lettering for providing a customized embroidery pattern on said selected garment at said user selected location.

24. A method for creating and automatically fulfilling a user customized embroidery order for a selectable garment over the internet, said method comprising the steps of:
   selecting a garment to be customized over the internet;
   selectably locating an embroidery area on said selected garment from a plurality of user selectable locations;
   selecting a customized embroidery pattern over the internet to be located in said user selected embroidery area;
   displaying an embroidered simulation of said user located customized embroidery pattern on said selected garment; and
   providing embroidery pattern control signals over the internet to a remotely located embroidery machine for automatically stitching said user located customized embroidery pattern on an actual garment corresponding to said selected garment based on said displayed embroidered simulation for automatically fulfilling said user customized embroidery order.

25. A method in accordance with claim 24 wherein said displaying step comprises the step of creating customized embroidery lettering.

26. A method in accordance with claim 24 wherein said customized embroidery pattern creating step comprises the step of creating customized embroidery lettering.

27. A method in accordance with claim 26 wherein said customized embroidery pattern creating step further comprises the step of combining a preexisting embroidery pattern with said customized embroidery lettering.

28. A method in accordance with claim 24 further comprising the step of providing a templated web site for creating and automatically fulfilling said customized embroidery order.

29. A method for creating a user customized embroidery order for a selectable garment over the internet, the method comprising the steps of:
   selecting a garment to be customized over the internet;
   selectably locating an embroidery area on said selected garment from a plurality of user selectable locations;
   uploading a user generated image over the internet;
   automatically converting said uploaded used generated image into an embroidery pattern; and
   displaying an embroidered simulation of said converted user located embroidery pattern on said selected garment.

30. A method in accordance with claim 29 further comprising the step of providing a cost estimate for stitching said embroidery pattern on an actual garment corresponding to said selected garment at said user selected location.

31. A method in accordance with claim 30 further comprising the steps of confirming said embroidery order for said converted embroidery pattern and providing embroidery pattern control signals over the internet to a remotely located embroidery machine for automatically stitching said converted embroidery pattern on said actual garment at said user selected location in response to said confirmed embroidery order.

32. A method in accordance with claim 29 further comprising the step of further comprising the step of creating customized embroidery lettering.

33. A method in accordance with claim 32 further comprising the step of combining said converted embroidery pattern with said customized embroidery lettering for providing a customized embroidery pattern on said selected garment at said user selected location.

* * * * *